United States Patent [19]

Barton

[11] 4,014,165
[45] Mar. 29, 1977

[54] DC-DC CONVERTER IN WATCH SYSTEM
[75] Inventor: Troyce D. Barton, Garland, Tex.
[73] Assignee: Texas Instruments Incorporated, Dallas, Tex.
[22] Filed: July 14, 1975
[21] Appl. No.: 595,975

Related U.S. Application Data
[62] Division of Ser. No. 454,052, March 25, 1974, Pat. No. 3,919,625.
[52] U.S. Cl. .................................. 58/23 BA; 321/2; 323/17; 323/22 T; 323/DIG. 1
[51] Int. Cl.² ........................ G04C 3/60; G05F 1/58
[58] Field of Search ............ 58/23 R, 23 BA, 50 R; 321/2, 18; 323/17, 22 T, DIG. 1

[56]  References Cited
UNITED STATES PATENTS 3,818,484  6/1974  Navamura et al. .............. 58/23 BA
3,828,547  8/1974  Fujita .................................. 58/50 R Primary Examiner—E. S. Jackmon
Attorney, Agent, or Firm—Harold Levine; Rene' Grossman; Stephen S. Sadacca

[57] ABSTRACT

A solid state watch having a DC to DC power converter responsive to timekeeping signals for powering a liquid crystal display. The power converter comprises a one-shot multivibrator responsive to an oscillatory timing signal from the timekeeping circuitry for generating a series of one-shot pulses having controlled width. A switching regulator is coupled to the one-shot multivibrator and converts a relatively low DC supply voltage into a relatively high DC output voltage in response to the oscillatory input signal. The switching regulator has temperature compensating feedback for compensating the output of the regulator in accordance with liquid crystal display characteristics with respect to ambient temperature changes.

10 Claims, 4 Drawing Figures

DC-DC CONVERTER IN WATCH SYSTEM

This is a division of application Ser. No. 454,052, filed Mar. 25, 1974 which is now U.S. Pat. No. 3,919,625.

This invention relates to power converters in general and more specifically to temperature compensated DC to DC voltage converters utilized in watch systems.

Electronic digital watches having electro optical displays are now well known. One commercially successful solid state watch utilizes a well known class of displays commonly referred to as liquid crystal displays. Such displays are driven by an AC signal due to deterioration of the liquid crystal material and the electrodes via hydrolisis if DC voltages are otherwise utilized. Reference, for example, U.S. Pat. Nos. 3,701,249 and 3,653,745. Due to the relatively high voltage requirement of liquid crystal displays, voltage converters for providing a stepped-up DC voltage level have been disclosed. One approach taken has been utilization of a DC to AC converter in combination with a voltage multiplier which converts the AC voltage to a higher DC voltage. Reference, for example, U.S. Pat. No. 3,668,860. Another approach is disclosed in copending patent application Ser. No. 263,920, filed June 19, 1972, and assigned to the assignee of this invention wherein a basic blocking oscillator in combination with a voltage doubler is utilized to provide the elevated DC voltage signal. However, such a circuit inconveniently requires a transformer.

Further, DC to DC voltage converters heretofore suggested also have suffered from other disadvantages. For example, when the liquid crystal cell is driven responsive to the main oscillator andd countdown chain in the timekeeping circuitry, such as is disclosed in the above referenced application Ser. No. 263,920, the AC drive typically is removed from the liquid crystal display upon oscillator/countdown circuit failure. If the voltage converter continues to operate notwithstanding the oscillator/countdown circuit failure, typically there is a DC voltage applied to the liquid crystal which significantly decreases display lifetime. Also, the resistance of and the threshold voltage of liquid crystal displays decrease with increasing ambient temperature. Conventional voltage converters heretofore have had a relatively constant output voltage versus temperature characteristic. That is, at higher temperatures the converter output voltage would remain constant while the threshold of the display decreased. Consequently, power supplied to the liquid crystal display is wasted which shortens the usefulness of the relatively limited lifetime battery in the watch.

It is therefore an object of the present invention to provide a DC to DC voltage converter which is responsive to an AC input signal for providing an elevated DC output signal, and which, upon failure of the AC input signal, provides a substantially reduced output DC voltage. Another object of the present invention is to provide such a DC to DC converter having a temperature compensating feedback circuit for providing a temperature compensated output voltage which decreases with increasing temperature and increases with decreasing temperature in accordance with liquid crystal display characteristics. It is yet another object of the present invention to provide a solid state watch system having such a temperature compensated DC to DC converter whereby the DC to DC converter circuit is cyclically actuated by the same switching input signal which actuates the driver of the liquid crystal display.

These and other objects are accomplished in accordance with one embodiment by providing a solid state watch having a DC to DC voltage coverter responsive to a high frequency voltage divider network for providing a relatively high DC supply voltage to the liquid crystal watch display. The frequency divider provides a plurality of relatively low frequency signals including a one Hertz signal which is input into a series of counters for generating time information, and one of the relatively low frequency signals is communicated to the DC to DC converter. The DC to DC converter comprises a one shot multivibrator coupled to a switching regulator with the one shot multivibrator being responsive to the one low frequency signal for providing a series of one shot output signals having controlled pulse widths. The series of controlled width pulses actuate a switching regulator including a serially connected inductor, diode, and compacitor combination. Preferably, the same one low frequency signal is communicated to the liquid crystal display driver for the AC actuation to the crystal and upon system oscillator or divider failure, both the AC actuation and the relatively high DC supply voltage are removed from the liquid crystal display drivers.

The DC to DC converter features temperature compensation feedback means from its output so that the regulator output is compensated in accordance with liquid crystal display characteristics with respect to ambient temperature changes.

Other objects and advantages of the invention will be apparent upon reading the following detailed description of illustrative embodiments in conjunction with the drawings wherein.

Figure 1:
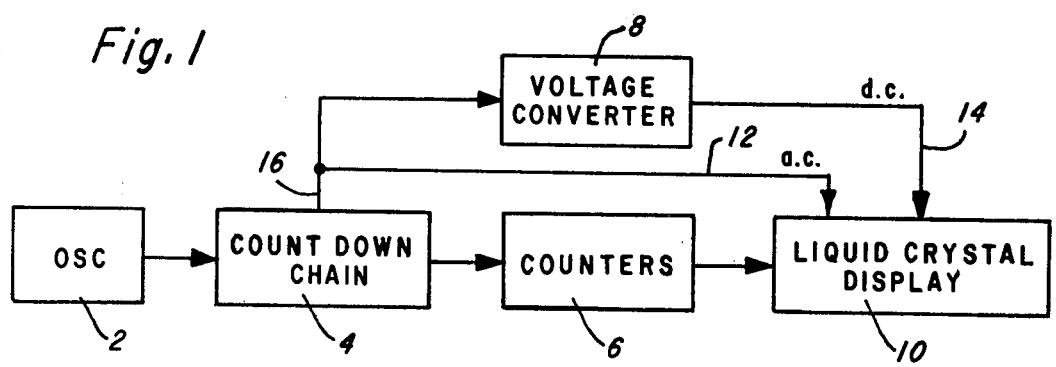
FIG. 1 depicts an exemplary watch system according to one embodiment of this invention.

Referring now to the drawings, there is shown in FIG. 1 a simplified functional blocked diagram of a watch system having a liquid crystal display. It is understood that displays other than of the liquid crystal type may suitably be utilized, but preferably the display is of the type requiring a supply voltage elevated from that of the watch battery. The watch battery (not shown in FIG. 1) supplies power to a high frequency oscillator 2, to a frequency dividing countdown chain 4, to counters 6 which generate the time information, and to the voltage converter 8 for providing the elevated supply voltage. It is understood that some systems requiring high voltages have the counters coupled to the voltage converter 8. Oscillator 2 is typically a conventional 32.768 K Hertz quartz oscillator which provides the 32.768 K Hertz frequency signal to the countdown chain 4 which reduces the frequency to one Hertz. The one Hertz signal is supplied to counters 6 which comprise pairs of serially connected divide-by-60 counters for supply seconds and minutes time information and a divide-by-12 counter serially coupled thereto for providing hours information. Counters 6 are typically further responsive to a higher frequency signal for setting the counters during time setting the watch with a time standard.

Output from the counters 6 is typically in BCD format and is communicated to the liquid crystal display 10. Liquid crystal displays are now well known and are driven by AC signals so as to increase display longevity. Preferably, a display driver circuit is provided which is responsive to a relatively low frequency signal, such as 64 Hertz, from the countdown chain 4 to provide an alernating voltage across the liquid crystal cell. The alternating driver voltage is generated from an elevated DC voltage on line 14 from the voltage converter 8 which converts the relatively low battery voltage of the system to a relatively high DC voltage which is utilized in providing the AC drive. One such liquid crystal driver cell responsive to a relatively high DC supply voltage and to an AC input signal is set forth in the copending patent application Ser. No. 263,920. The supply voltage on line 14 according to the preferred embodiment, however, is generated in response to output from the countdown chain 4 on line 16. Such dependence by the voltage converter 8 on functioning of the countdown chain 4 is advantageous in that liquid crystal display lifetime rapidly deteriorates with applicationof a DC voltage. Therefore, upon an otherwise failure of a countdown chain such that the AC drive to the liquid crystal display is otherwise removed, then the DC source on line 14 may be impressed upon the liquid crystal cell. However, in accordance with FIG. 1 when the voltage converter 8 is responsive to the countdown chain 4, upon failure of the oscillator 2 or the countdown chain 4, then not only is the AC input to the liquid crystal on line 12 removed, but also the DC source on line 14 is reduced to that of the low battery voltage preserving display lifetime.

Figure 2:
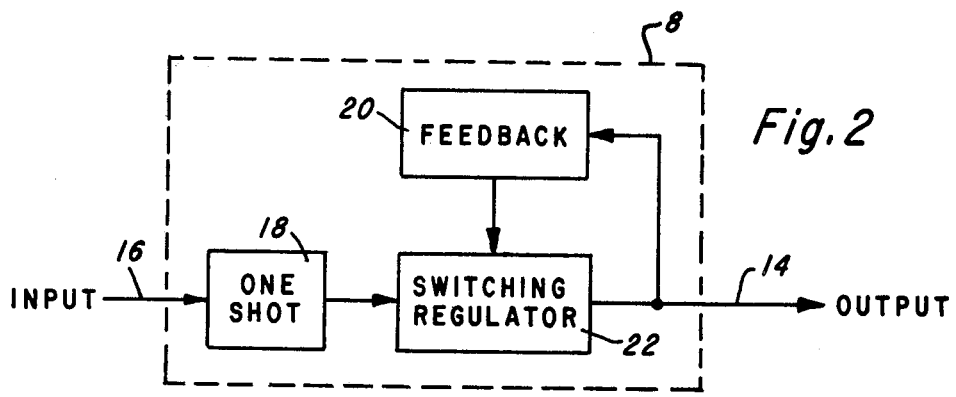
FIG. 2 depicts a simplified blocked diagram of the DC to DC power converter utilized in the watch system of FIG. 1.

FIG. 2 depicts a functional block diagram representing the voltage converter 8 in FIG. 1. Converter 8 comprises a one shot multivibrator 18 which provides a series of pulses having predetermined pulse width to the switching regulator 22. Although not shown, the switching regulator 22 is responsive to the battery voltage of the watch system and generates an elevated output voltage on line 14 in response to the series of pulses from one shot 18. Preferably, a 64 Hertz signal is input into one shot 18 on line 16 from the countdown chain 4. Other frequencies may suitably be substituted therefor, but preferably the frequency providing the AC input to the liquid crystal display is utilized as an input to the voltage converter 8.

Because the output of regulator 22 is relatively constant with respect to ambient temperature changes, and because the output on line 14 is utilized to provide drive to liquid crystal display which has a well defined temperature versus threshold/operating voltage characteristic, feedback means 20 are provided for regulating the output of the switching regulator 22 in accordance with the liquid crystal display temperature characteristics. Such a feedback 20 insures that only a proper required amount of power is provided to the display. Feedback 20 effectively controls the pulse widhs of the series of pulses from the one shot 18 for controlling the charging time of the output of the switching regulator 22. By choosing the one shot pulse width to be approximately 150 microseconds duration, then the switching regulator 22, hereafter described, fires on every cycle of the one shot, thereby providing a more regulated and smoother output voltage.

Figure 3:
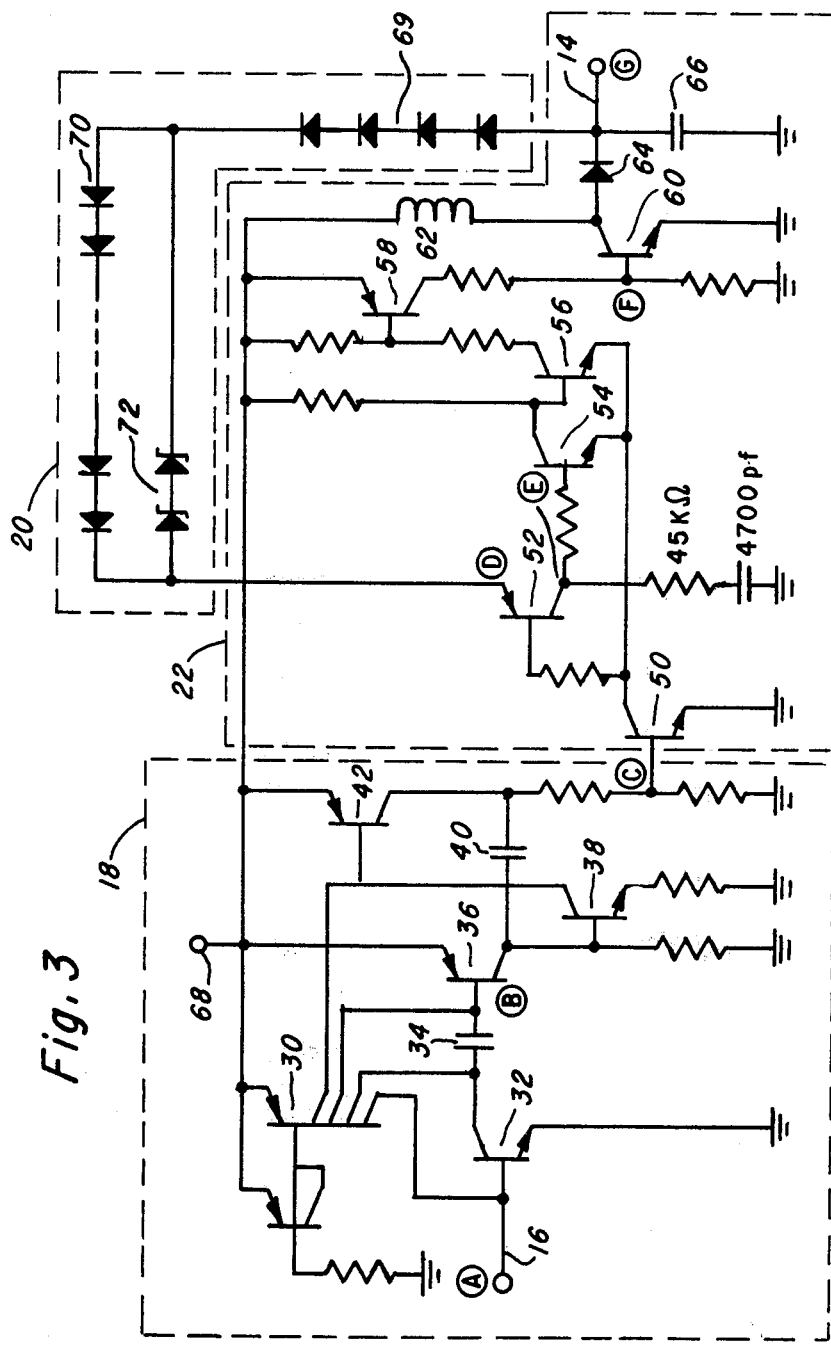
FIG. 3 depicts a preferred embodiment of the DC to DC power converter of FIG. 2.
Figure 4:
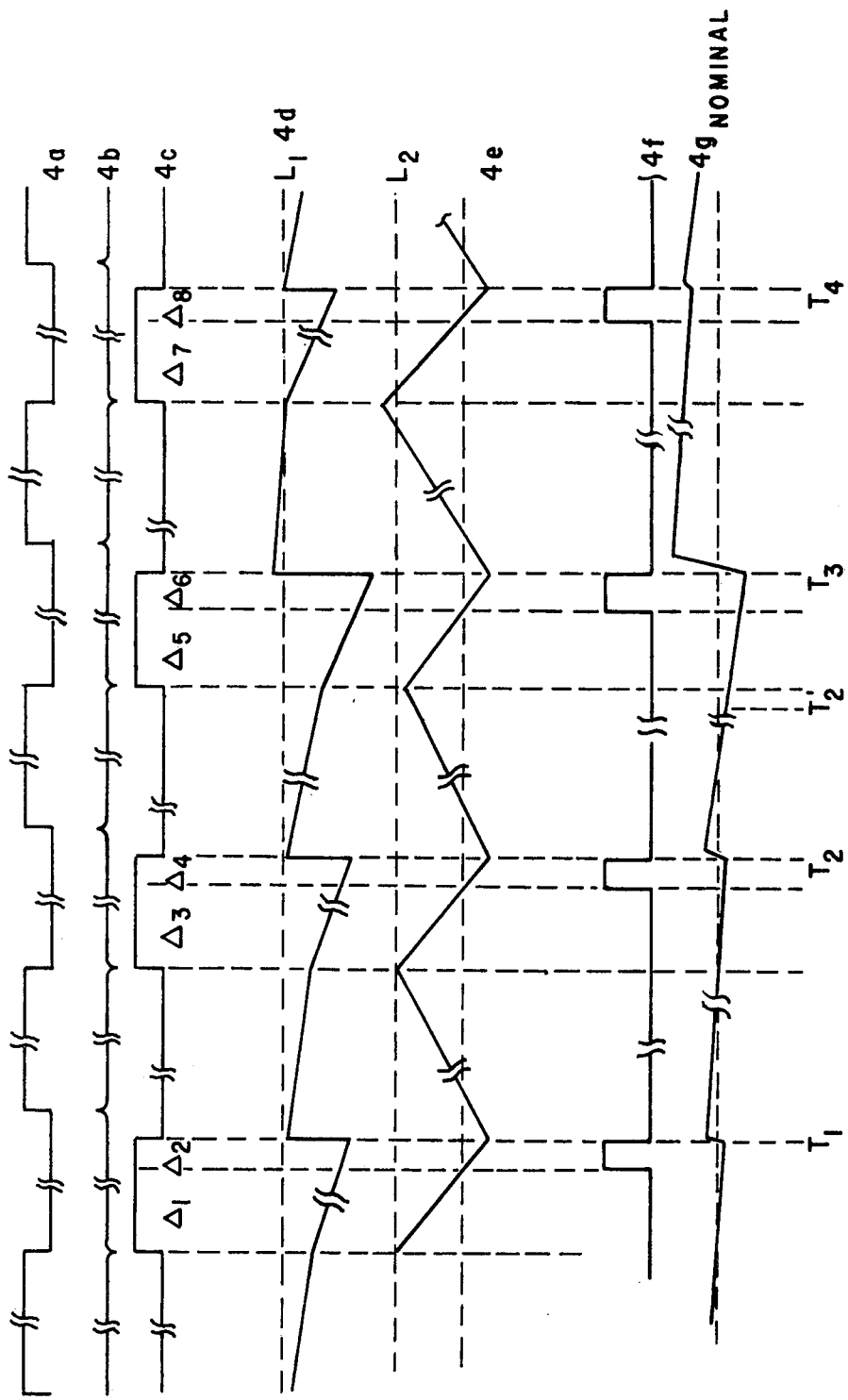
FIG. 4 shows typical wave forms illustrating operation of the DC to DC converter of FIG. 3.

Referring now to FIGS. 3 and 4, a preferred specific embodiment of the voltage converter 8 and representative voltage wave forms during its operation are depicted. In FIG. 4, wave forms 4a–4g correspond to the nodes labeled A . . . G in FIG. 3. The one shot multivibrator 18 is responsive to a relatively low frequency, such as 64 Hertz, input signal on line 16 from the countdown chain. The duration of the one shot output is such that each cycle of the input signal on line 16 generates a pulse to the switching regulator 22. This guarantees that the switching regulator 22 will fire every cycle to insure a more regulated and smoother output signal.

An input transistor 32 of one conductivity type receives the 64 Hertz input signal on its base and is loaded by constant current source transistor 30 having one of its multiple collectors connected to the collector of input transistor 32 and to the base terminal thereof. Transistor 30 simulates a 10 megohm load resistor. Capacitor 34 coupling the collector of input transistor 32 to the base of transistor 36 of the opposite polarity type is of relatively small value for coupling only sharp positive and negative spikes into the base of transistor 36. Current source transistor 30 has another collector connected to the base of transistor 36 which essentially functions as a bleeder resistor for pulling the base of transistor 36 high after a negative going voltage spike has driven it low. Complementary transistor pair 42 and 38 in combination with capacitor 40 provide a temporary latch for rendering transistors 38 and 42 temporarily conductive. With the capacitance of capacitor 40 chosen such that an output pulse width of preferably 150 microseconds is generated, then upon capacitor 40 charging in accordance with anegative going spike communicated through capacitor 34, transistor 42 is driven nonconductive and the positive going pulse at node C is terminated. That is initially, if capacitor 40 is a short circuit, then as transistor 36 becomes conductive rendering transistor 38 conductive, then the base of transistor 42 is lowered in voltage causing transistor 42 to become conductive, as the collector thereof is guaranteed to be one diode drop lower than its base due to the arrangement with transistor 38.

Referring then to FIG. 4, it is seen at node A an alternating wave form is generated representing the frequency derived from the dountdown chain, while at node B a series of positive and negative going voltage spikes are generated through capacitor 34. The negative going voltage spikes of FIG. 4b initiate the start of each output pulse at node C with the termination of each pulse determined by the timing circuitry associated with the above latch circuit including capacitor 40.

In FIG. 4c, the pulse widths $\Delta 1 + \Delta 2$, $\Delta 3 + \Delta 4$, $\Delta 5 + \Delta 6$, and $\Delta 7 + \Delta 8$ preferably each represent a pulse width of approximately 150 microseconds. The remainder of each cycle represents a time period determined by the frequency chosen from the countdown chain 4. The wave form shown in FIG. 4b is input into transistor 50 of the one conductivity type for driving it conductive during each positive pulse thereof. The collector of transistor 50 is coupled to transistors 52, 54 and 56 so as to insure that the output of the switching regulator at node G is being charged only during a portion of the 150 microsecond period. Otherwise, the output is driven nonconductive in response to the feedback network 20 providing temperature compensation. The output of transistor combination 52, 54 and 56 at the collector of transistor 56 is coupled to the base of output control transistor 58 which selectively couples the base terminal of output transistor 60 to the supply voltage on terminal 68. Output transistor 60 couples inductor 62 to circuit ground upon actuation thereof by control transistor 58 in accordance with the pulses at node C and the feedback at node D. The serial combination of diode 64 and capacitor 66 alternatively coupling inductor 62 to circuit ground provides a discharge path therefor when output transistor 60 is rendered nonconductive. When inductor 62 discharges, capacitor 66 is charged accordingly until a threshold established by feedback network 20 is reached. Inductor 62 is typically of 500 microhenrys so as to provide approximately a 60 volt open current spike upon collapse of its field after less than a 150µ second charging period. Capacitor 66 is preferably 1000 pf.

Feedback network 20 comprises a first set of unidirectionally connected diodes 69 and 70 and a second set 72 of unidirectionally connected series diodes coupled in parallel with and in the opposite direction than first set 70. As is well understood in the art semiconductor p/n junction elements have a negative temperature co-efficient, in that as temperature increases, thresholds decrease, and conversely; an effect similar to that found in liquid crystal displays. Whenever the feedback threshold is reached, then transistor 52 conducts to charge the series connected R-C timing network according to the magnitude of the feedback voltage and the R-C parameters. The resistors connected to the bases of transistors 52 and 54 are large, i.e., 100 K ohms each, such that when transistor 50 is nonconductive, the base of transistor 52 floats, allowing emitter-collector conduction therethrough. For a typical 150 microsecond pulse at 64 Hertz and a 15 ½ voltage output, typical R-C values are R = 45 K ohm and C = 4700 pf. This amount of charge stored on the base of transistor 54 by this timing network during the "off" phase of the output transistor causes transistor 54 to snap conductive immediately upon transistor 50 becoming conductive. The period transistor 54 remains conductive keeping the output ransistor nonconductive. After the base charge bleeds off through the base-emitter of transistor 54 through the $V_{SAT}$ of transistor 50, transistor 54 becomes nonconductive allowing transistor 56 to cause the output transistor 60 to become conductive. When transistor 50 is driven nonconductive by the negative going side edge of the signal at node C, the output transistor 60 turns off. Inductor 62 therefore ceases charging at which time the field collapses, and it discharges through diode 64 into capacitor 66. It is thus seen that by controlling the amount of charge on inductor 62 the amount of charge deposited in capacitor 66 is controlled for providing a controlled output voltage. Feedback p/n junction set 72 preferably exhibiting a 6.4 volt reverse breakdown connected in the reverse direction insures that a not too large threshold is established by sets 69 and 70 as reverse breakdown occurs across set 72 if too high a threshold is attempted to be established, such as greater than 15 ½ volts d.c.

Referring To FIGS. 4d-4g in FIG. 4, operation of the circuit will become more apparent. The series of approximately 150 microsecond pulses are input into input transistor 50 as shown in FIG. 4c. When input transistor 50 becomes conductive represented by periods $\Delta 1 + \Delta 2$, $\Delta 3 + \Delta 4$, $\Delta 5 + \Delta 6$, and $\Delta 7 + \Delta 8$ in FIG. 4c, then initially transistor 56 is driven conductive after a period determined by feedback means 20 and the amount of charge on the base of transistor 54. That is, when transistor 56 becomes conductive, output transistor 60 is rendered conductive as shown by the negative going pulses in FIG. 4f causing charging of inductor 62. The threshold of the feedback means 20 is fixed such that every cycle sufficient voltage is fed back to the emitter of transistor 52 to cause transistor 54 to be rendered conductive when the RC timing network connected to the collector of transistor 52 reaches the threshold level. Referring to FIG. 4d at time T1 upon transistor 50 becoming conductive, the base of transistor 54 begins discharging in accordance with the RC network in FIG. 4d when transistor 54 is conductive, its base is clamped at a $V_{SAT}$ plus a $V_{BE}$ above ground during the period $\Delta 1$ allowing discharge of the base charge. The period $\Delta 2$ is determined by the amount of time required to drive transistor 54 nonconductive, which is determined by the amount of charge on the output capacitor fed back to transistor 52 from the output node G. When transistor 50 turns off, as seen in FIG. 4f, the output transistor is driven nonconductive, causing the field of inductor 62 to collapse discharging a spike through diode 64 into capacitor 66 causing an increase in the output voltage. In FIG. 4, time T1 and T2 represent typical loading of the output of the DC to DC converter while time T2 prime depicts a situation where an extraordinary load is applied to node G causing an extraordinary drop in the output voltage. This drop causes less voltage to be fed back to transistor 52 and less charge to be generated on the base T52 at the beginning of 05 having magnitude less than level L2 as shown in FIG. 4e, which causes a shorter period $\Delta 5$ before transistor 54 is driven nonconductive, causing output transistor 60 to begin conducting earlier and therefore to remain conductive for a longer time which allows inductor 62 to charge to a higher value.

Finally, upon the ending of period $\Delta 6$ when transistor 54 is driven conductive, output transistor 60 turns off and a larger voltage spike is conducted into capacitor 66 causing the output voltage to increase above the nominal level. Such causes a larger amount of feedback to the transistor 52 as shown after the expiration of period $\Delta 6$ with amplitude higher than level L1, causing a charge on T52 greater than level L2 so that upon the beginning of the next pulse at $\Delta 7$, a relatively longer amount of time is required to drive transistor 54 nonconductive causing output transistor to be "on " a lesser amount of time. Thus in FIG. 4 as represented above, $\Delta 6 > \Delta 2 = \Delta 4 > \Delta 8$. Such sequence occurs every cycle, or 64 times a second causing a very smooth and highly regulated output voltage.

It is understood that the voltage wave forms in FIG. 4 are highly exaggerated for illustrational purposes only. Therefore, although seemingly large changes are seen, for example in FIG. 4g, it is understood that in actuality such a change may be relatively insignificant.

If for some unforeseen reason the AC input at node A into the one shot multivibrator fails, then output transistor 60 never is driven conductive. Instead, the relatively low supply voltage on pin 68, somewhat on the order of 1 ½ – 3 volts minus a diode voltage, charges the output capacitor 66 so that a substantially reduced DC voltage is applied to the display. By applying the 1 ½ – 3 volts instead of approximately 15 volts otherwise applied during normal operation, even though the oscillator or countdown chain fails, life of the liquid crystal display is prolonged.

It will be appreciated that a watch system has been provided featuring a DC to DC voltage converter which provides an elevated output DC voltage from a relatively small DC supply voltage in response to an AC input signal from the timekeeping circuitry. The output is compensated every cycle of the AC input signal, and the output is further compensated in accordance with temperature/operating characteristics of a liquid crystal display so as to conserve power and prolong battery life. Furthermore, longevity of the liquid crystal display is enhanced upon system failure by supplying a reduced operating DC voltage used in supplying the AC voltage drive thereto.

What is claimed is;

1. A solid state electronic watch comprising an oscillator providing a relatively high frequency signal, frequency divider means coupled to said oscillator for providing a plurality of relatively low frequency signals including a one Hertz signal, a plurality of interconnected counters responsive to said one Hertz signal for providing a plurality of time signals representative of time information, a liquid crystal display coupled to said counters having a plurality of digits for displaying time information and powered by a relatively high DC supply voltage, and a voltage converter coupled to receive a relatively low DC supply voltage and responsive to one of said low frequency signals for generating relatively high DC supply voltage to said liquid crystal display, said voltage converter being comprised of one shot multivibrator means coupled to a switching regulator, said one shot multivibrator means being responsive to said one low frequency signal and said switching regulator providing said relatively high DC supply voltage.

2. The system according to claim 1 wherein said another one signal is a 64 Hertz signal.

3. The system according to claim 2 wherein said one shot multivibrator includes timing means for providing said controlled pulse widths of substantially 150 microseconds.

4. The watch according to claim 1 wherein said liquid crystal display is further responsive to said one of said low frequency signals for providing AC drive thereto.

5. The watch according to claim 1 wherein said switching regulator includes temperature compensation feedback means for modifying said relatively high DC supply voltage in accordance with changes in ambient temperature and liquid crystal display temperature characteristics.

6. The watch according to claim 1 wherein said voltage converter comprises a switching regulator having its output fed back to its input via temperature compensation means for adjusting said relatively high DC supply voltage in accordance with temperature change characteristics of said liquid crystal display.

7. The watch according to claim 6 wherein said temperature compensation means comprise series connected P-N junction devices.

8. The watch according to claim 5 wherein said switching regulator includes (a) first transistor means having its base coupled to the output of said one shot multivibrator means, its emitter coupled to said temperature compensation feedback means, and its emitter coupled to a timing network, and (b) second transistor means and third transistor means having commonly coupled emitter terminals connected to said output of said one shot multivibrator means, the base of said second transistor means connected to said collector of said first transistor means.

9. The watch according to claim 8 and further including (a) inductor means, (b) output transistor means having its collector-emitter terminal path serially connected to said inductor means, and (c) means coupling the base of said output transistor means to said third transistor means.

10. An electronic watch system comprising:
  a. one shot multivibrator means responsive to an oscillatory input signal for generating a series of one shot signals having controlled pulse widths,
  b. a switching regulator coupled to said one shot multivibrator means and adaptive to receive a supply voltage of a first magnitude for generating a DC output voltage of magnitude substantially greater than said first magnitude, said regulator including a serially connected inductor, diode, and capacitor combination such that the field of said inductor cyclically charges and collapses in response to said series of signals, and said capacitor charges in response to the collapse of said inductor field to provide said DC output voltage,
  c. temperature compensation feedback means coupling said capacitor to the input of said switching regulator for adjusting said output voltage in accordance with temperature changes
  d. electronic timing circuitry comprising a high frequency oscillator and frequency divider means coupled thereto for providing a plurality of low frequency signals.
  e. a plurality of interconnected counter means responsive to at least a selected one of said low frequency signals for providing time information, and
  f. visual display means comprised of liquid crystals for displaying said time information, another one of said low frequency signals coupled to said one shot multivibrator as said oscillatory input signal.

* * * * *